United States Patent
Fleizach (10) Patent No.: US 10,264,212 B1
(45) Date of Patent: Apr. 16, 2019

(54) LOW-COMPLEXITY DEINTERLACING WITH MOTION DETECTION AND OVERLAY COMPENSATION

(71) Applicant: Gregory Knowles Fleizach, San Diego, CA (US)

(72) Inventor: Gregory Knowles Fleizach, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 0 days.

(21) Appl. No.: 16/020,264

(22) Filed: Jun. 27, 2018

(51) Int. Cl.
*H04N 7/01* (2006.01)

(52) U.S. Cl.
CPC .......... *H04N 7/0137* (2013.01); *H04N 7/014* (2013.01)

(58) Field of Classification Search
CPC ........ H04N 7/0137; H04N 7/014; H04N 7/01; H04N 7/012; H04N 7/0142; H04N 7/0135; H04N 11/20
USPC ................. 348/441, 448, 450–453, 458, 459
See application file for complete search history.

(56) References Cited

U.S. PATENT DOCUMENTS

| | | | |
|---|---|---|---|
| 5,134,480 A | 7/1992 | Wang et al. | |
| 5,473,383 A * | 12/1995 | Sezan | H04N 7/012 348/448 |
| 6,459,455 B1 | 10/2002 | Jiang et al. | |
| 6,614,485 B2 | 9/2003 | Shin et al. | |
| 7,170,562 B2 | 1/2007 | Yoo et al. | |
| 7,321,396 B2 | 1/2008 | Jung et al. | |
| 7,515,205 B1 | 4/2009 | Wang et al. | |
| 8,045,820 B2 | 10/2011 | Huang et al. | |
| 8,629,937 B1 | 1/2014 | Zhou | |
| 8,704,945 B1 | 4/2014 | Xin | |
| 2005/0206786 A1 | 9/2005 | Leaback | |

OTHER PUBLICATIONS

Jeon et al. "Improved Low-Complexity Interpolation Algorithm for Deinterlacing." The Online Journal on Electronics and Electrical Engineering, vol. 2, No. 2.

* cited by examiner

*Primary Examiner* — Sherrie Hsia
(74) *Attorney, Agent, or Firm* — NIWC Pacific; Kyle Eppele (57) ABSTRACT

A method and system for deinterlacing. A memory receives a current input image frame and a next input image frame. A processor estimates motion between the current input image frame and the next input image frame. Based on the motion estimate, a deinterlace map is created that indicates where the current input image frame should be deinterlaced. The current input image frame is split into fields, the first frame being an odd field frame, the second frame being an even field frame. The processor interpolates missing lines in the image. Two deinterlaced frames are output, with the first deinterlaced frame being based on the odd field frame and the second deinterlaced frame being based on the even field frame.

20 Claims, 8 Drawing Sheets

LOW-COMPLEXITY DEINTERLACING WITH MOTION DETECTION AND OVERLAY COMPENSATION

STATEMENT OF GOVERNMENT INTEREST

Federally-Sponsored Research and Development

The United States Government has ownership rights in this invention. Licensing inquiries may be directed to Office of Research and Technical Applications, Space and Naval Warfare Systems Center, Pacific, Code 72120, San Diego, Calif., 92152; telephone (619)553-5118; email: ssc_pac_t2@navy.mil. Reference Navy Case No. 103583.

BACKGROUND OF THE INVENTION

Field of Invention

This disclosure relates to image processing, and more particularly, to removing the results of interlacing in images.

Description of Related Art

Many video standards are still in use that produce interlaced video, e.g. National Television System Committee (NTSC). Interlacing is created by video cameras which capture a full scene in two fields with half the vertical resolution. For example, at time to, the sensor captures the scene in the odd pixel rows (i.e., the odd "field"). At time $t_0+\Delta t$ (where $\Delta t$ is half the frame period), the sensor captures the scene in the even pixel rows. At time $t_0+2\Delta t$, the sensor captures the scene in the odd pixel rows, etc. This technique allows the camera to only store half the pixels at each $\Delta t$ (half the bandwidth of recording the full scene each frame period). The result looks fine on cathode ray tube (CRT) displays, which use interlacing to display the scene by first drawing the odd pixel rows, then the even, then the odd, etc.

Figure 1:
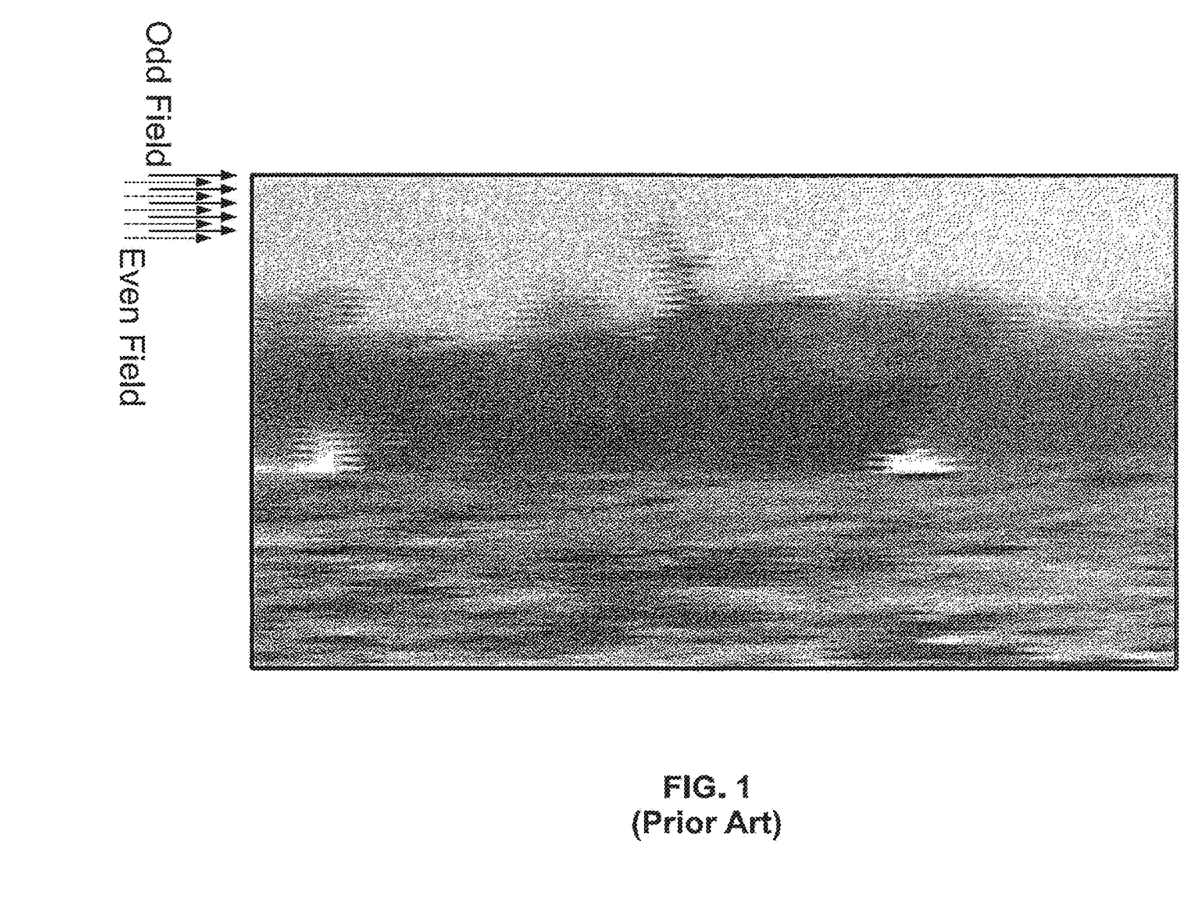
FIG. 1 is an example of interlace tearing in accordance with the prior art.

However, when viewed on computer monitors or modern televisions (e.g. LCD, plasma), which display all the pixels of a frame at once (i.e., "progressive"), the interlacing appears as a "tearing" of the image if there is any movement. The larger the movement, the more pronounced the tearing. An example of tearing caused by interlacing is shown in FIG. 1, and it is especially noticeable on the bow of the boat.

The artifacts caused by interlacing are known as "tearing," "mouse teeth," "combing," or simply "interlacing effects." These artifacts are the result of capturing the odd fields and the even fields at distinct points in time and displaying them together. Motion in the video will cause the odd fields and the even fields to be misaligned and the result will look similar to the image shown in FIG. 1.

Figure 2:
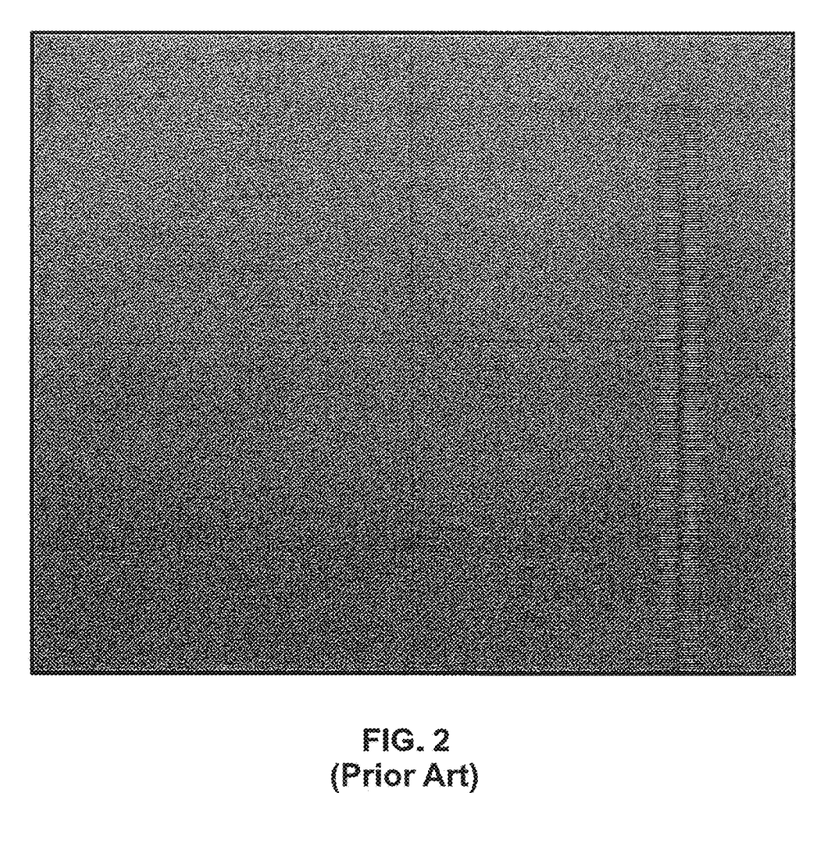
FIG. 2 is an example of object separation with fast motion in accordance with the prior art.

Another artifact from interlacing occurs during fast motion (or when observing small objects), whether the motion is from an object within the scene or the camera itself. In these cases, a single object separates into two objects, with the distance between them relative to the speed of motion. An example is given in FIG. 2, which is an example of object separation with fast motion. In FIG. 2, one antenna looks like two. Each "antenna" is composed of only odd pixel rows or only even pixel rows.

Numerous deinterlacing methods of widely varying complexity have been proposed over the years, but they all suffer from one drawback or another. Spatial averaging filters can remove the interlacing effects, but at the cost of spatial image blurring (i.e., loss of spatial resolution). Averaging frames in the temporal dimension is also used, but like spatial averaging, this can lead to blurring (i.e., loss of temporal resolution).

Some deinterlacing methods double the frame rate by giving each field from the original frame its own frame. The frame from the odd field is then missing the even lines and conversely, the frame from the even field is missing the odd lines. One approach to interpolate the missing pixels is to average the pixel above and the pixel below. This produces poor results, however. More advanced interpolation methods generally look better, but suffer from interline "twitter" or "bob," which occurs when there are horizontal lines in the scene. That is, horizontal lines appear to jump up and down from frame-to-frame.

More advanced deinterlacing methods perform extensive computations, but can also include adaptive processing for each pixel, which make parallelization difficult. Other methods require time-recursion and its associated high complexity, or block-matching, which can also prevent parallelization and real-time implementation.

There is a need for a deinterlacing system and method that produces a clearer image and is less complex. There is further a need for a deinterlacing system and method that provide for intelligent interpolation.

BRIEF SUMMARY OF INVENTION

The present disclosure addresses the needs noted above by providing a system and method for low-complexity deinterlacing with motion detection and overlay compensation. In accordance with one embodiment of the present disclosure, a method is provided for deinterlacing. The method can comprise the steps of: (a) receiving, at one or more memory devices, a current input image frame and a next input image frame; (b) estimating, by a processor, motion between the current input image frame and the next input image frame and determining whether the estimated motion is less than a predetermined frame motion threshold, and if so, ending steps of the method for deinterlacing; (c) otherwise, if the estimated motion between the current input image frame and the next input image frame is greater than or equal to the frame motion threshold, then creating a deinterlace map that indicates that the entire current input image frame is to be deinterlaced; (d) otherwise, if the estimated motion for a given pixel in the current input image frame and the next input image frame is greater than or equal to the frame motion threshold, then comparing, by the processor, the motion estimate for said pixel to a pixel motion threshold, thus creating a deinterlace map that indicates where on the map deinterlacing is to be performed.

The methods can further include the steps of: (e) deinterlacing, by the processor, the current input image frame according to the deinterlace map, including by: (i) splitting, by the processor, the current input image frame into fields, said fields including an odd field frame and an even field frame; and (ii) interpolating, by the processor, missing lines in the odd field frame and the even field frame; and (f) outputting, by the processor, two deinterlaced frames that include interpolated missing lines, wherein said first deinterlaced frame is based on the odd field frame, and wherein said second deinterlaced frame is based on the even field frame; (g) repeating steps (a) through (f) for each current input image frame and each next input image frame.

These, as well as other objects, features and benefits will now become clear from a review of the following detailed description, the illustrative embodiments, and the accompanying drawings.

BRIEF DESCRIPTION OF DRAWINGS

The accompanying drawings, which are incorporated in and form a part of the specification, illustrate example embodiments and, together with the description, serve to explain the principles of low complexity deinterlacing with motion detection and overlay compensation. In the drawings.

DETAILED DESCRIPTION OF THE INVENTION

Figure 3:
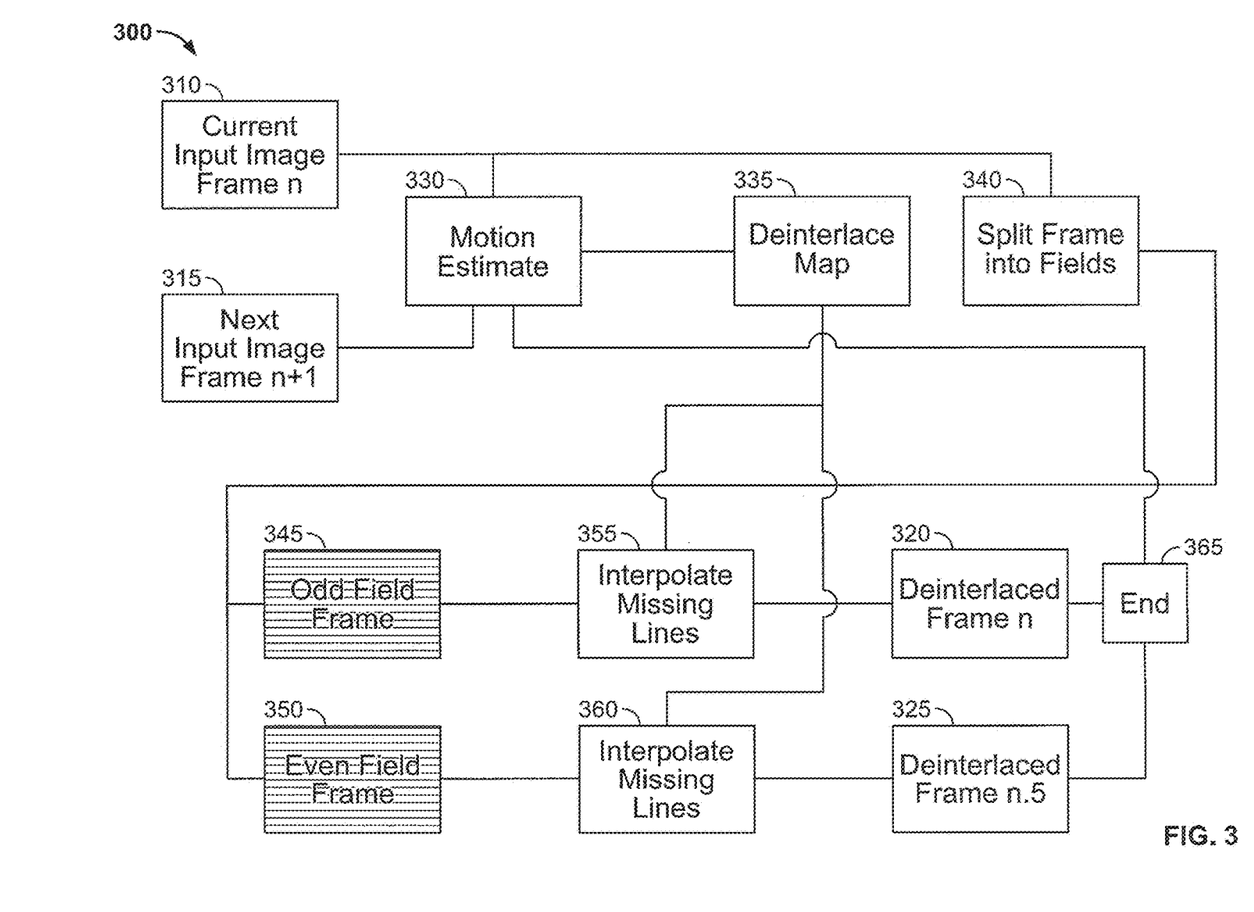
FIG. 3 illustrates a flow chart for a low complexity deinterlacing method with motion detection and overlay compensation in accordance with one embodiment of the present disclosure.

The present deinterlacing method and system can involve splitting each frame into odd and even fields and then using intelligent interpolation to fill in the respective missing lines of the two new frames. Referring initially to FIG. 3, a flow chart of a low complexity deinterlacing method with motion detection and overlay compensation in accordance with one embodiment of the present disclosure can be illustrated and can be generally referred to with reference character 300. The method 300 can include the steps of receiving, at one or more memory devices, a current input image frame n at 310 and a next input image frame n+1 at 315. For example, if the current input image frame is frame one at step 310, then the next input image frame is frame two at step 315.

The one or more memory devices that may receive the current input image frame n and the next input image frame n+1, may reside on—or be a part of—an electronic imaging system that can also include a processor, e.g., a digital camera. Alternatively, by way of non-limiting example, the memory device may be a part of a computer system used to post-process an interlaced image or video. The current input image frame n 310 and the next input image frame n+1 315 may be from a video or they may simply be still images. The method and system described herein can be used with color video; however, the method and system can also be applied to monochrome video as well with few modifications. In lieu of video, the method and system can also be applied to single images as well with few modifications.

Each current input image frame 310 may eventually generate two deinterlaced output frames at frame n 320 and frame n.5 325 so that the frame rate is doubled (e.g., from thirty frames per second to sixty frames per second). However, the deinterlacing technique can cause horizontal lines to bob up and down. Therefore, at step 330, the motion is calculated and thereby, estimated, between the current input image frame and the next input image frame. The estimation at step 330 can be accomplished both on a frame basis and on a pixel basis. The calculations/estimations are performed by a processor. All other steps performed in connection with this method may be performed by a processor.

One way to calculate the motion estimate at 330 on a frame basis may be simply to calculate the absolute value of the average pixel-by-pixel difference between the current frame 310 and the next frame 315, averaged across the three color channels which are red, green and blue. That is, $$I_{motion} = \Sigma_c \, abs(I_{current}^c)/3 \qquad \text{(Equation 1)}$$

where c is the channel index. Thus, $I_{motion}$, the motion estimate, has the same width and height as the input images $I_{next}$ and $I_{current}$, but only one channel. Other methods can certainly be used to generate an initial motion estimate, based on processor requirements and capabilities and the knowledge of the amount and magnitude of "motion video" in the video frames that are being processed.

If the mean of the motion across the whole image, or $$mean_{I_{motion}} = mean(mean(I_{motion})) \qquad \text{(Equation 2)}$$

(where each mean operates on one dimension) is greater than the frame motion threshold (5 seems to be a good value, if the image range is [0,255]), the entire image will be deinterlaced (i.e., all pixels in threshold map 335 will be designated for deinterlacing). The threshold value of five (5) was heuristically determined and other values may be used as may be determined by those of ordinary skill in the art. If the mean of the motion across the whole image is not greater than the frame motion threshold, the processor's pixel-by-pixel motion estimate from step 330 for each pixel in current frame 310 can be compared to a predetermined pixel motion threshold (10 seems to be a good value, as heuristically determined). The frame motion and pixel motion from step 330 can result in the generation of a deinterlace map at step 335. This deinterlace map indicates where deinterlacing should be performed. The deinterlace map may be dilated with a five by five (5×5) morphological filter to fill in any undetected motion, as described more fully below.

When the motion is estimated at step 330, the processor may determine that there is no motion. When there is no motion across an image, there are no interlacing effects. Therefore, where there is no motion in a region of an image, there will be no need to deinterlace that region of the image. Avoiding the deinterlacing of stationary regions helps mitigate horizontal line bob; in can also conserve processor resources for areas of the image that actually need to be deinterlaced. In this connection, for each pixel in the current input image frame and the next input image frame, if the mean of the estimated motion for every pixel across the entire image is less than a frame motion threshold, then the deinterlacing method/process ends and there is no need to carry out further steps in connection with deinterlacing. If there is no motion, the current input image frame may be treated as the output frames (i.e., the "deinterlaced" frames) so that the process proceeds to the deinterlaced frame n 320 and deinterlaced frame n.5 325 and then ends at step 365.

In addition to removing artifacts, the present deinterlacing method can mitigate issues with reticles. Reticles are horizontal and vertical lines in nominally fixed locations in the image (see FIG. 2). They help the operator perform menstruation. To avoid horizontal line bob, the pixel motion threshold is different around reticle locations. That is, the pixel motion threshold may change depending on the area of the image. In other words, the pixel motion threshold may be spatially dependent. In areas of the image where a known overlay exists—e.g. horizontal lines of a reticle centered in the height dimension (e.g. in FIG. 2)—the pixel motion threshold may be doubled, or otherwise increased by any amount, to compensate for the overlay. For example, a band of, say, eight (8) pixels that are height-centered on the horizontal line will have the pixel motion threshold doubled (e.g. from ten (10) to twenty (20)). This step is useful because depending on where in the imaging chain the reticle is applied, the reticle may not actually be in a fixed pixel location in the image, but may drift several pixels in either direction. Thus, the motion of the reticle might trigger the lower pixel motion threshold and cause deinterlacing to be applied, which would lead to a bobbing horizontal line.

The comparison of the estimated motion to the spatially-dependent thresholds creates a "deinterlace map" at step 335. This deinterlace map indicates the regions where deinterlacing is to be performed. If the mean motion across the entire image passes the threshold for the whole image, then the deinterlace map would contain all the pixels in the image and the entire image would be deinterlaced. Otherwise, the deinterlace map identifies the specific pixels that will be deinterlaced. A deinterlace map may assign a value of one (1) to each pixel to be deinterlaced. The deinterlace map may assign a value of zero (0) to be pixel that is not be interlaced.

This deinterlace map prevents unnecessary computations because areas of the image with no motion (pixels with a 0 value) do not require the following deinterlacing steps.

After the motion estimation at step 330, the current frame is then split into fields at step 340. At 345, an odd field frame is generated. That is, all odd pixel rows would be in this frame. This would include rows one, three, five, seven, etc. At step 350, an even field frame is generated. Therefore, all even pixel rows would be in this frame. This would include rows two, four, six, eight, etc. The first deinterlaced frame n is created at step 320 by assigning the odd field to the odd field of the new frame. Similarly, deinterlaced frame n.5 can be created at step 325 by assigning the even field to the even field of the new frame. At step 355, missing lines are interpolated for the odd field frame 345. At step 360, missing lines are interpolated for the even field frame 350. Interpolation steps 355 and 360 for interpolating missing lines, can be accomplished by computing the intensity of the image 345 and 355 (which can further be computed from a transformation computed from the red, green, blue (RGB) color space to the hue, saturation and intensity (HSI) color space). As part of steps 355 and 360 for interpolating missing lines, after the transformation to HSI color space, the intensity channel can be extracted, but the hue and saturation fields can be retained for later use. For example, basically, at step 360 for an empty pixel in the even field, the system weights the interpolation based on the dominant edge direction, as determined by the computed intensity.

Alternatively, instead of duplicating the hue and saturation channels from the original frame to the two deinterlaced frames created at steps 320 and 325 (to conserve processor resources), the hue and saturation values for the even field in the odd frame can be interpolated in a similar manner to the intensity values. This could provide a more accurate result, but with additional computations. Instead of an RGB to HSI transformation before interpolation, a transformation to another color space with separate intensity and color channels could be used. For example, transformations to YCbCr or L*a*b* would be acceptable as well.

Figure 4:
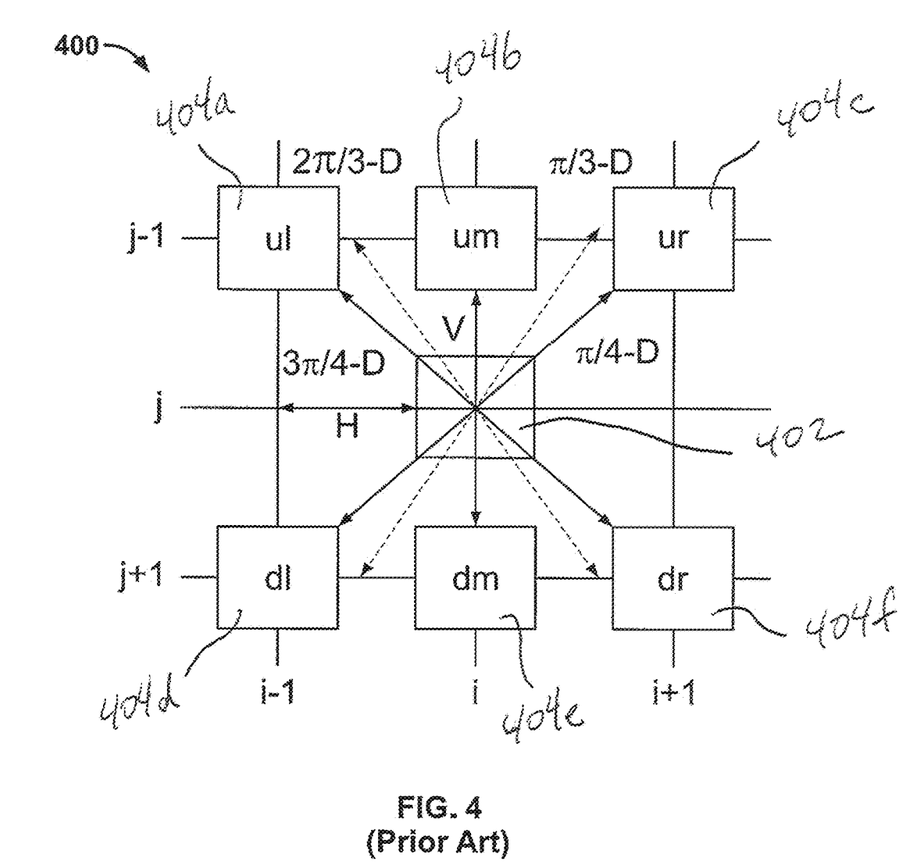
FIG. 4 is a spatial window as known in the prior art, which can depict direction-based deinterlacing in accordance with one embodiment of the present disclosure.

Referring now to FIG. 4, illustrated is a spatial window for direction-based deinterlacing. This spatial window is known in the prior art. Each empty pixel has the neighbors as shown in FIG. 4, where pixel 402 in the center can be an empty even field pixel and the pixels 402a-402f can be odd field pixels.

The direction strength $\Gamma$ and direction co parameters can determine the dominant edge for each even field pixel. These parameters can be calculated as follows:

$$\Gamma_v = \text{abs}(u_m - d_m)$$

$$\Gamma_{\frac{\pi}{4}} = \text{abs}(u_r - d_l)$$

$$\Gamma_{\frac{\pi}{3}} = \text{abs}\left(\frac{u_r + u_m}{2} - \frac{d_l + d_m}{2}\right)$$

$$\Gamma_{\frac{2\pi}{3}} = \text{abs}\left(\frac{u_l + u_m}{2} - \frac{d_m + d_r}{2}\right)$$

$$\Gamma_{\frac{3\pi}{4}} = \text{abs}(u_l - d_r)$$

where $u_l$ (upper left), $u_m$ (upper middle), $u_r$ (upper right), $d_l$ (down left), $d_m$ (down middle), and $d_r$ (down right) are shown in FIG. 4 The variable V stands for vertical, D stands for diagonal and H stands for horizontal. Then pixel weights for an image of i×j pixels (i.e., having a horizontal coordinate of i and vertical coordinate of j) can be calculated based on which F value is a minimum as seen below:

$$\text{if}\left\{\left(\min_\Gamma = \Gamma_{\frac{\pi}{4}}\right) \& (\Gamma_v \neq 0)\right\} \rightarrow \omega_v = \frac{\Gamma_{\frac{\pi}{4}}}{\Gamma_v}, \omega_{\frac{\pi}{4}} = 1 - \omega_v$$

$$\text{else if}\left\{\left(\min_\Gamma = \Gamma_{\frac{\pi}{3}}\right) \& (\Gamma_v \neq 0)\right\} \rightarrow \omega_v = \frac{\Gamma_{\frac{\pi}{3}}}{\Gamma_v}, \omega_{\frac{\pi}{3}} = 1 - \omega_v$$

$$\text{else if}\left\{\left(\min_\Gamma = \Gamma_{\frac{2\pi}{3}}\right) \& (\Gamma_v \neq 0)\right\} \rightarrow \omega_v = \frac{\Gamma_{\frac{2\pi}{3}}}{\Gamma_v}, \omega_{\frac{2\pi}{3}} = 1 - \omega_v$$

$$\text{else if}\left\{\left(\min_\Gamma = \Gamma_{\frac{3\pi}{4}}\right) \& (\Gamma_v \neq 0)\right\} \rightarrow \omega_v = \frac{\Gamma_{\frac{3\pi}{4}}}{\Gamma_v}, \omega_{\frac{3\pi}{4}} = 1 - \omega_v$$

$$\text{else} \rightarrow \omega_v = 1, \omega_{\frac{\pi}{4}} = 1, \omega_{\frac{2\pi}{3}} = 1, \omega_{\frac{3\pi}{4}} = 1$$

It should be noted that the present system and method involve calculations that are different from the prior art. The prior art, for example, may calculate the co parameters as the inverse, i.e. $1/\omega_p$, instead of the difference from 1 as with the present system and method. The present system and method, by calculating the difference from 1, generates more robust results against a wide variety of scenarios. The empty pixel value in the even field, $x_{i,j}$, is then computed using the following conditional statements:

$$\text{if}\left\{\min_\Gamma = \Gamma_{\frac{\pi}{4}}\right\} \rightarrow x_{i,j} = \frac{\omega_{\frac{\pi}{4}}(u_r + d_l) + \omega_v(u_m + d_m)}{2\left(\omega_{\frac{\pi}{4}} + \omega_v\right)}$$

$$\text{else if}\left\{\min_\Gamma = \Gamma_{\frac{\pi}{3}}\right\} \rightarrow x_{i,j} = \frac{\omega_{\frac{\pi}{3}}\left(\frac{u_r + u_m + d_m + d_l}{2}\right) + \omega_v(u_m + d_m)}{2\left(\omega_{\frac{\pi}{3}} + \omega_v\right)}$$

$$\text{else if}\left\{\min_\Gamma = \Gamma_{\frac{2\pi}{3}}\right\} \rightarrow x_{i,j} = \frac{\omega_{\frac{2\pi}{3}}\left(\frac{u_l + u_m + d_m + d_r}{2}\right) + \omega_v(u_m + d_m)}{2\left(\omega_{\frac{2\pi}{3}} + \omega_v\right)}$$

-continued $$\text{else if } \left\{ \min_{\Gamma} = \Gamma_{\frac{3\pi}{4}} \right\} \rightarrow x_{i,j} = \frac{\omega_{\frac{3\pi}{4}}(u_l + d_r) + \omega_v(u_m + d_m)}{2\left(\omega_{\frac{3\pi}{4}} + \omega_v\right)}$$

$$\text{else} \rightarrow x_{i,j} = \frac{u_m + d_m}{2}$$

Note that all the preceding interpolation calculations must be performed for each empty pixel in the even field as denoted by the deinterlace map, but only on pixels in the rows that are designated by the deinterlace map for deinterlacing. The rest of the empty pixels can be copied from the even field of the original frame.

The above can then be repeated for the second deinterlaced frame. The second deinterlaced frame (denoted frame n.5 at step 325 in FIG. 3 because it is halfway between frame n 310 and frame n+1 315 in time) is generated by filling in the even lines with the even field from the original frame. The empty odd field is then filled pixel-by-pixel with the interpolation equations described above. The two deinterlaced frames created at steps 320 and 325 only contain intensity values though so the original hue and saturation channels are duplicated to fill in the empty hue and saturation values. This applies to filling in hue and saturation where the intensity has been deinterlaced. Each of the two deinterlaced frames uses the same hue and saturation channels as the original frame. The deinterlaced HSI images are then converted back to RGB for display. When the motion estimate is zero, meaning that there is no motion, the intensity values in the original frames are used.

At this point, two completely deinterlaced frames have been created at steps 320 and 325. It may be helpful to note that the current frame n at step 310 and the deinterlaced frame n at step 320 represent substantially the same moment in time. At step 320, a new frame is created for original frame n that doesn't have interlacing issues (deinterlaced frame n). The other deinterlaced frame at step 325 is created from the frame is a time instant between the original nth frame and the (n+1)$^{th}$ frame so it is called the n.5 frame. As mentioned above, deinterlacing can create artifacts, particularly on horizontal edges, so only areas with motion should be deinterlaced. Thus, the interpolation steps described above are only required at the pixel locations indicated by the deinterlace map that are above the pixel threshold and designated for deinterlacing. The deinterlace map is a binary map indicating where the pixels should be replaced with deinterlaced values (the white pixels in FIG. 5A), or where the pixel values should remain unchanged in which case the pixel would be represented with a zero (the black pixels in FIG. 5A). Pixels that are unchanged according to the deinterlace map can simply be copied from the original image. The resulting frames are a mixture of interpolated pixels and pixels from the original frame (unless whole frame motion was detected, in which case the empty fields of the new frames contain are completely filled with interpolated values).

Figure 5A:
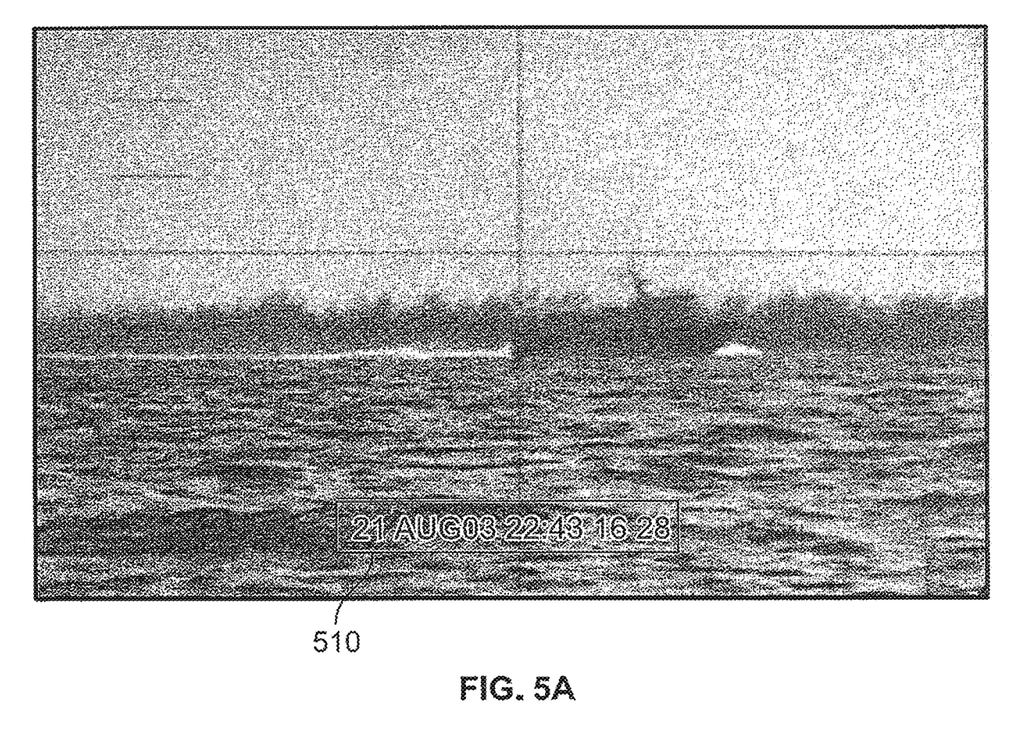
FIG. 5A is an example of video with text in static locations in accordance with one embodiment of the present disclosure.

Another step that can be accomplished for the systems and methods according to some embodiments can be to account for any regions of the video that have text. Referring now to FIG. 5A, illustrated is a video having text 510 in static locations. The video image is a boat on moving water with foliage and sky in the background. The text is an overlay, added after the image was captured. To reduce potential effects of bobbing horizontal lines and artifacts that may be produced on the top and bottom edges of text and any other horizontal edges, a different deinterlacing algorithm (with a higher pixel motion threshold for the image portions that have text) is used for the regions encompassing the text. This algorithm may not be quite as effective at deinterlacing, but it does not cause bobbing and it is very difficult to tell the regions are processed differently unless there is fast motion.

In the new odd frame, the even lines in the text window denoted by the deinterlace map are replaced with the average of the even lines from the previous frame and the even lines from the current frame. This makes intuitive sense because the odd field captures the scene halfway between the two even fields. The averaging is performed only in regions where the text 510 exists, thus reducing the computational load of the deinterlacing system and reduces processor load requirements so that a slower processor can be used. The accounting for text steps can occur during the accomplishment of steps 355 and 360. The deinterlacing system is described later in further detail in FIG. 7. Analogously, in the new even frame, the odd lines in the text window are replaced with the average of the odd lines from the current frame and the next frame. If a video does not have text, this step should be omitted because there can be blurring artifacts in this region upon fast movement. In most cases though, the artifacts are hardly noticeable. Regions of the image with text can be accommodated with the overlay compensation by using a distinct interpolation method to prevent horizontal line bob.

As a last step to deinterlacing (not shown in FIG. 3), the missing lines from the top and bottom of the frames (because the odd and even frames do not align exactly) could be copied from adjacent frames. These "missing lines" occur because the odd frame cannot interpolate the last row since there is no row below the last row to use in the interpolation step. Similarly, the even frame is missing the first row. An alternative to filling in the missing lines by copying lines from adjacent frames in the last step is that the lines could be omitted entirely by cropping the deinterlaced images. Additionally, this missing lines could use a modified interpolation method based on the single line above or below.

Figure 5B:
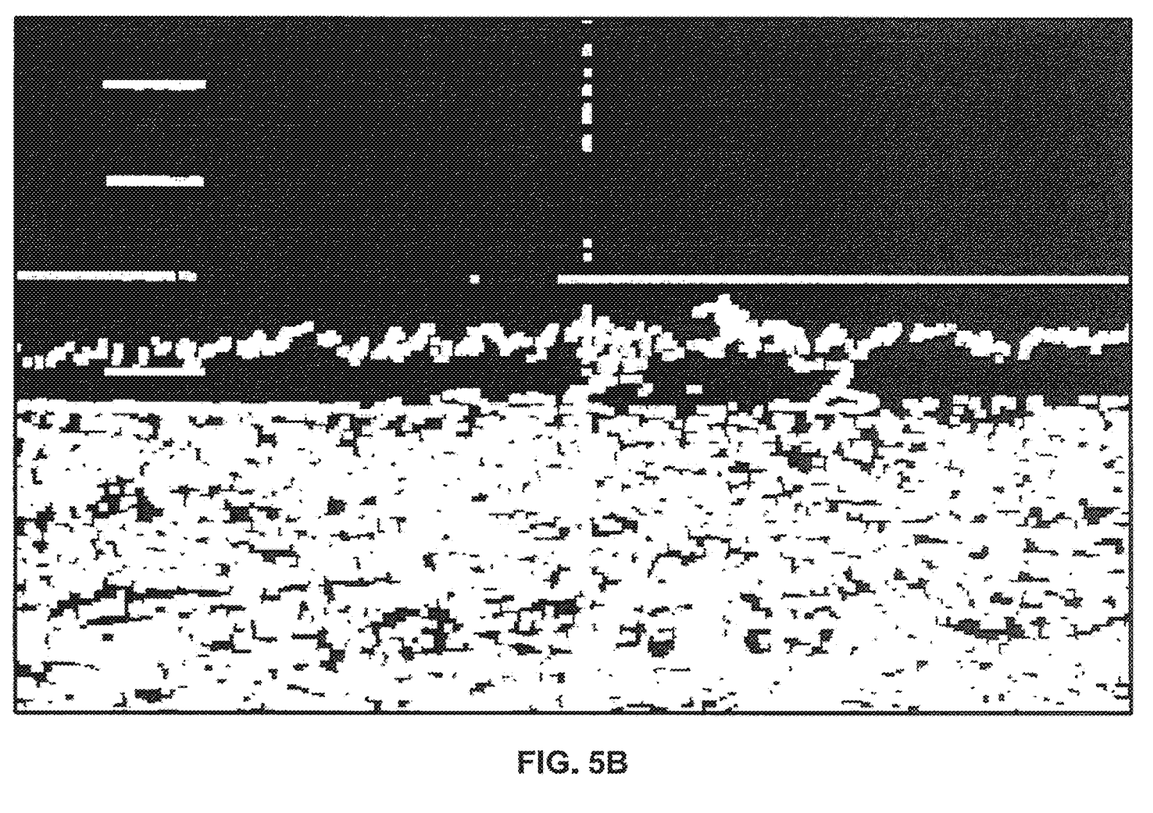
FIG. 5B is an example of a deinterlace map in accordance with one embodiment of the present disclosure.

FIG. 5B can be an illustration of a deinterlace map of the image of FIG. 5A that resulted from the accomplishment of step 330 in accordance with one embodiment of the present disclosure. The white pixels in FIG. 5A are where deinterlacing will be applied. A pixel value of one (1) could be assigned to these pixels where deinterlacing is to be applied. The black pixels are where deinterlacing will not be applied. A pixel value of zero could be applied to these pixels where deinterlacing is not to be applied. The water is in motion as are the tops of the foliage. The edges of the boat can be seen just to the right of the center of the image. As shown in FIG. 5B, deinterlacing computations are actually only performed on about half of the pixels in the image frame, which can reduce the processor and memory resources needed by the systems and methods of the present invention.

Figure 6:
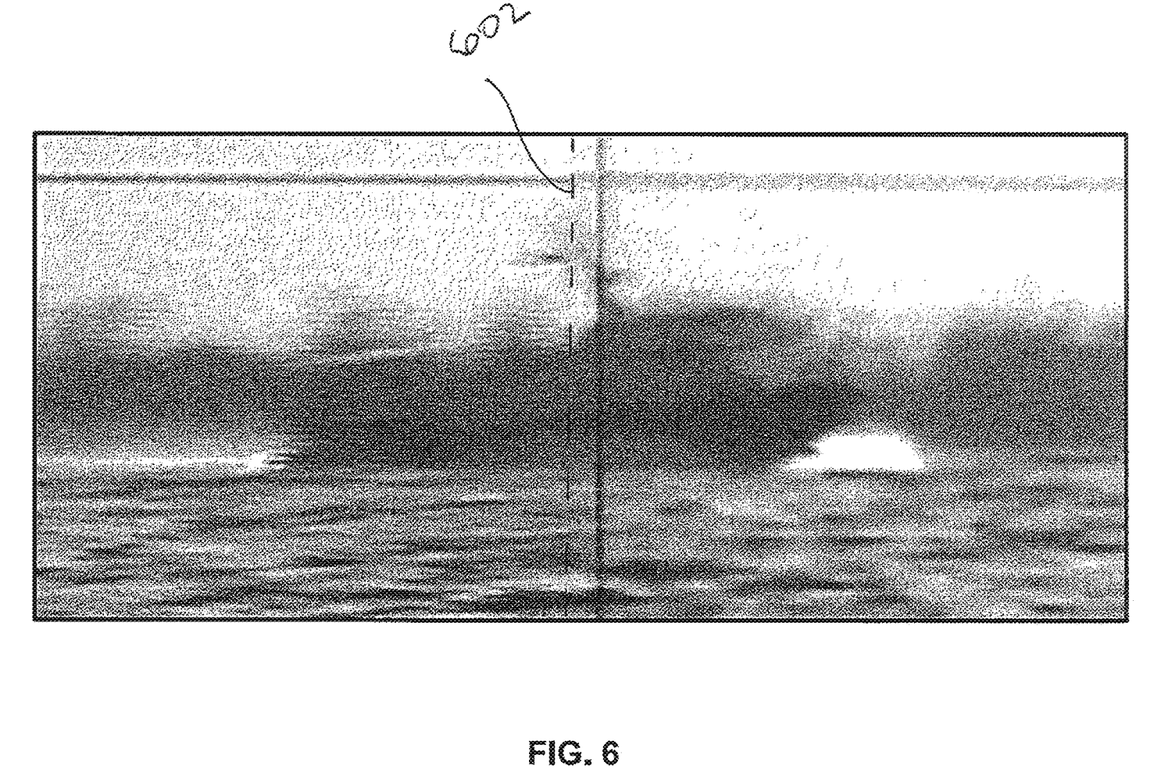
FIG. 6 is a diagram of an original image versus a deinterlaced image in accordance with one embodiment of the present disclosure; and, FIG. 7 illustrates a system for a low complexity deinterlacing method with motion detection and overlay compensation in accordance with one embodiment of the present disclosure.

Referring now to FIG. 6, the left half of FIG. 6 shows an original frame, while the right half of FIG. 6 shows a zoomed-in example of a frame with deinterlacing on the right. The dashed line 602 has been added to denote the halves of the image. The tearing can be seen on the left half of the image, but this is eliminated in the deinterlaced portion on the right. Note that, as discussed earlier, the reticle, which is nominally centered in the image is shifted nearly fifteen (15) pixels to the right.

The deinterlacing method described herein does not require as many computations as other methods. That is, the number of computations required to interpolate each missing pixel is reduced. Further, it can deinterlace the entire frame or disconnected regions, if necessary, based on the deinterlace map. This deinterlace map is motion dependent. The deinterlace map can prevent unnecessary deinterlacing, e.g., where no motion is present. The deinterlace map helps to avoid unnecessary computations and the potential creation of artifacts.

The present deinterlacing method is better than adaptive methods in that the number of computations for each missing pixel varies within a small range, which makes it more amenable to parallelization (e.g. GPU implementation for real-time processing). Similarly, this method does not require time-recursion, with its associated high complexity, to achieve excellent results, and it does not use block-matching, which can also prevent real-time processing.

This deinterlace method produces a deinterlaced image that is not noticeably blurred and no resolution is lost. In fact, the temporal resolution is seemingly enhanced and the result is a very smooth deinterlaced video.

This deinterlace method is very robust to a wide variety of scenarios. It has not been shown to create any artifacts besides horizontal line bob in some cases, which can be heavily mitigated by the motion threshold and deinterlace map.

The resulting sixty frames per second video could be converted by to thirty frames per second by eliminating the even frames (or alternatively, the odd frames). This is effectively a loss in temporal resolution (since each frame represents a distinct moment in time) and a loss in spatial resolution (since either the odd or even frames contain interpolated pixels), but the result may be acceptable for some use cases. The reduction in frame rate may be necessary due to display limitations or possibly due to a need to further conserve scarce processor resources for that can be required for further downstream enhancements of the video (e.g. contrast enhancement, dehazing, etc.).

Figure 7:
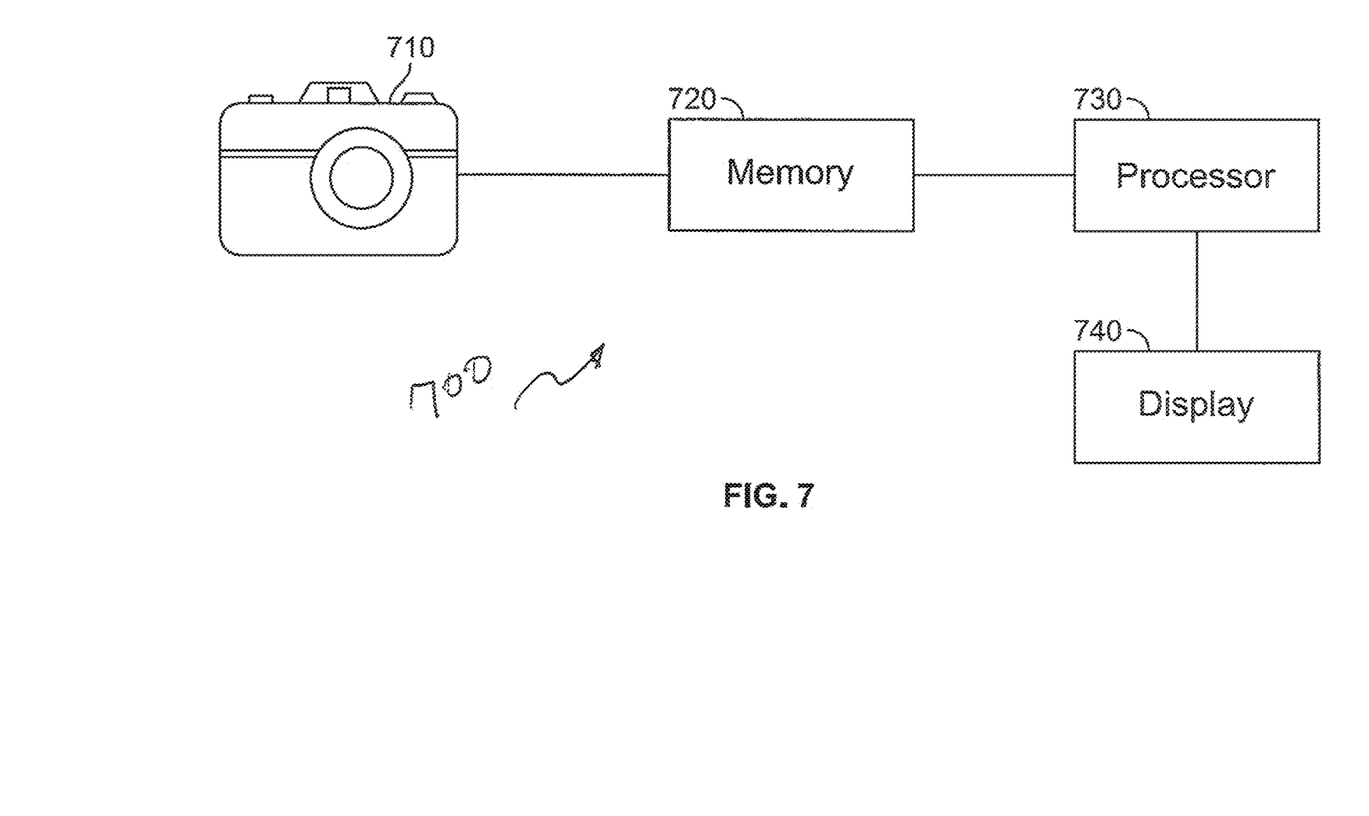

FIG. 7 is a system for low complexity deinterlacing with motion detection and overlay compensation in accordance with one embodiment of the present disclosure. The system 700 may include an imaging system 710, a personal computer having memory 720 that can be operably coupled to the imaging system 710, a processor 730 that can be operably coupled to the imaging system 710 (through memory 720 in FIG. 7) and a display 740 that can be operably coupled to the imaging system 710 (via memory 720 and processor 730). Other configurations are possible, or these components can be integrated into a singly component system 700. The imaging system 710 could be any video camera. Imaging system 710 can connect to memory 720. The original video, the current input image frame and the next input image frame may be fed from the imaging system 710 to the memory 720. The image may be fed from memory 720, to another processor 730 such as a graphics processing unit. As an alternative to the system of FIG. 7, memory 720 may reside in a personal computer. Numerous configurations for imaging system 710, memory 720 and processor 730 are known in the art.

Software (not shown in FIG. 7) may be resident in memory 720, which may cause the processor 730 to perform one or more steps of the method for deinterlacing as set forth herein. If mechanical/electrical devices (whether existing as part of the imaging system or added thereafter) can be used to further aid in in this process, such devices may be located within the body of imaging system 710 or elsewhere as can be appreciated by one of ordinary skill in the art.

Memory 720, as noted hereinabove, may be sufficient to hold at least the video, including a current input image frame and a next input image frame. The instructions in memory 720 may also be sufficient to store the deinterlaced images that are output by the deinterlacing system 700. Memory 720 may also include other elements such as processing steps or instructions related to deinterlacing. Examples of such processing steps are described in the block diagram of FIG. 3.

The speed of the processor 730 needed may depend on the application in which the processor 730 is used, as can be appreciated by one of ordinary skill in the art.

The foregoing description of various embodiments has been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A method for deinterlacing, comprising the steps of:
    (a) receiving, at one or more memory devices, a current input image frame and a next input image frame, said current image frame and said next image frame each having a respective plurality of pixels;
    (b) estimating, by a processor, motion between the current input image frame and the next input image frame;
    (c) ending the method for deinterlacing when the estimated motion from step (b) is less than a predetermined motion threshold;
    (d) otherwise, creating a deinterlace map of the current input image frame;
    (e) for the plurality of pixels in the deinterlace map of step (d), comparing, by the processor, the motion estimate for each of the pixels to a pixel motion threshold otherwise; and,
    (f) deinterlacing the pixels of the step (e), said step (f) being accomplish only on pixels where the pixel motion is greater than the pixel motion threshold.

2. The method of claim 1, where the deinterlacing step is accomplished by:
    (i) splitting, by the processor, the current input image frame into fields, said fields including an odd field frame and an even field frame; and
    (ii) interpolating, by the processor, missing lines in the odd field frame and the even field frame.

3. The method of claim 2, further comprising the steps of:
    (g) outputting, by the processor, two deinterlaced frames that include a first deinterlaced frame and a second deinterlaced frame, the two deinterlaced frames including interpolated missing lines, wherein said first deinterlaced frame is based on the odd field frame, and wherein said second deinterlaced frame is based on the even field frame; and
    (h) repeating steps (a) through (g) for each current input image frame and each next input image frame.

4. The method of claim 1, wherein the deinterlacing step further includes:
    determining whether the current input image frame includes text;
    if so, receiving a previous input image frame and the current input image frame; and in an odd frame, replacing the even lines of text with an average of even lines from the previous input image frame and an average of even lines from the current input image frame; and in an even frame, replacing the odd lines of text with an average of odd lines from the current input image frame and the next input image frame.

5. The method of claim 1, wherein the deinterlacing step further includes:

dilating, by the processor, the deinterlace map with a morphological filter to fill in any undetected motion.

6. The method of claim 1, wherein the interpolated missing lines include copied lines from the top and bottom of adjacent frames.

7. The method of claim 1, further comprising increasing the pixel motion threshold, which includes approximately doubling the pixel motion threshold to compensate for an overlay.

8. The method of claim 1, wherein the estimating step includes:

calculating an absolute value of the difference between the current input image frame and the next input image frame, averaged across color channels according to the following formula:

$$I_{motion} = \Sigma_c \, abs(I_{next}\hat{}c - I_{current}\hat{}c)/3$$

where $I_{motion}$ is the motion estimate, c is a channel index, $I_{next}$ is the next input image frame and $I_{current}$ is the current input image frame.

9. The method of claim 1, wherein the current input image frame and the next input image frame are from a color video.

10. A system for deinterlacing with motion detection and overlay compensation, the system comprising:

a memory configured to receive a current input image frame and a next input image frame;

a processor configured to:
  estimate motion between the current input image frame and the next input image frame;
  for each pixel in the current input image frame and the next input image frame, determine whether a mean of the estimated motion for each said pixel is less than a frame motion threshold;
  if the mean of the estimated motion between the current input image frame and the next input image frame is greater than or equal to the frame motion threshold, then create a deinterlace map that indicates that the entire current input image frame is to be deinterlaced;
  if the mean of the estimated motion for a pixel in the current input image frame and the next input image frame is greater than or equal to the frame motion threshold, compare the motion estimate for said pixel to a pixel motion threshold, thus creating a deinterlace map that indicates where deinterlacing is to be performed;
  deinterlace the current input image frame according to the deinterlace map, wherein the processor is further configured to:
    divide the current input image frame into fields, said fields including an odd field frame and an even field frame; and
    interpolate missing lines in the odd field frame and the even field frame; and
    output two deinterlaced frames that include interpolated missing lines, wherein said first deinterlaced frame is based on the odd field frame, and wherein said second deinterlaced frame is based on the even field frame.

11. The system of claim 10, wherein the processor is further configured to:

increase the pixel motion threshold to compensate for an overlay.

12. The system of claim 11, wherein the increase is approximately double the pixel motion threshold to compensate for the overlay.

13. The system of claim 10, wherein the processor is further configured to:

dilate the deinterlace map with a filter to fill in any undetected motion.

14. The system of claim 10, wherein the interpolated missing lines include copied lines from the top and bottom of adjacent frames.

15. The system of claim 10, wherein the processor is configured to estimate motion by:

calculating an absolute value of the difference between the current input image frame and the next input image frame, averaged across color channels according to the following formula:

$$I_{motion} = \Sigma_c \, abs(I_{next}\hat{}c - I_{current}\hat{}c)/3$$

where $I_{motion}$ is the motion estimate, c is a channel index, $I_{next}$ is the next input image frame and $I_{current}$ is the current input image frame.

16. The system of claim 10, wherein the current input image frame and the next input image frame are from a color video.

17. The system of claim 10, wherein the current input image frame and the next input image frame are from a monochrome video.

18. A method for deinterlacing, comprising the steps of:
(a) receiving, at one or more memory devices, a current input image frame and a next input image frame;
(b) estimating, by a processor, motion between the current input image frame and the next input image frame;
(c) for each pixel in the current input image frame and the next input image frame, determining whether a mean of the estimated motion for each said pixel is less than a frame motion threshold, and if so, ending steps of the method for deinterlacing;
(d) otherwise, if the mean of the estimated motion between the current input image frame and the next input image frame is greater than or equal to the frame motion threshold, then creating a deinterlace map that indicates that the entire current input image frame is to be deinterlaced;
(e) otherwise, if the mean of the estimated motion for a pixel in the current input image frame and the next input image frame is greater than or equal to the frame motion threshold, then comparing, by the processor, the motion estimate for said pixel to a pixel motion threshold, thus creating a deinterlace map that indicates where deinterlacing is to be performed;
(f) deinterlacing, by the processor, the current input image frame according to the deinterlace map, including by:
  (i) dividing, by the processor, the current input image frame into fields, said fields including an odd field frame and an even field frame; and
  (ii) interpolating, by the processor, missing lines in the odd field frame and the even field frame;
  (iii) determining whether the current input image frame includes text, and if so:

(A) receiving a previous input image frame and the current input image frame;

(B) in the odd frame, replacing the even lines of text with an average of even lines from the previous input image frame and an average of even lines from the current input image frame; and (C) in the even frame, replacing the odd lines of text with an average of odd lines from the current input image frame and the next input image frame;

(g) outputting, by the processor, two deinterlaced frames that include a first deinterlaced frame and a second deinterlaced frame, the two deinterlaced frames including interpolated missing lines, wherein said first deinterlaced frame is based on the odd field frame, and wherein said second deinterlaced frame is based on the even field frame; and (h) repeating steps (a) through (g) for each current input image frame and each next input image frame.

19. The method of claim 18, further comprising:

increasing the pixel motion threshold to compensate for an overlay.

20. The method of claim 18, wherein the estimating step includes:

calculating an absolute value of the difference between the current input image frame and the next input image frame, averaged across color channels according to the following formula:

$$I_{motion} = \Sigma_c \, abs(I_{next}\hat{\,}c - I_{current}\hat{\,}c)/3$$

where $I_{motion}$ is the motion estimate, c is a channel index, $I_{next}$ is the next input image frame and $I_{current}$ is the current input image frame.

* * * * *